(12) United States Patent
Lavallee

(10) Patent No.: US 6,817,852 B2
(45) Date of Patent: Nov. 16, 2004

(54) DIRECT CAVITY GATE GOLF BALL INJECTION MOLD

(75) Inventor: Gerald A. Lavallee, Belchertown, MA (US)

(73) Assignee: Callaway Golf Company, Carlsbad, CA (US)

( * ) Notice: Subject to any disclaimer, the term of this patent is extended or adjusted under 35 U.S.C. 154(b) by 451 days.

(21) Appl. No.: 09/754,530

(22) Filed: Jan. 4, 2001

(65) Prior Publication Data

US 2002/0086074 A1 Jul. 4, 2002

(51) Int. Cl.[7] .......................... B29C 45/33; B29C 45/34; B29C 45/36
(52) U.S. Cl. .................... 425/116; 425/129.1; 425/125; 425/577; 264/278; 264/279.1
(58) Field of Search .............................. 425/116, 129.1, 425/125, 577; 264/278, 279.1

(56) References Cited

U.S. PATENT DOCUMENTS

| | | | |
|---|---|---|---|
| 2,361,348 A | * | 10/1944 | Dickson et al. ............. 264/278 |
| 4,959,000 A | | 9/1990 | Giza |
| 5,122,046 A | | 6/1992 | Lavallee et al. |
| 5,147,657 A | | 9/1992 | Giza |
| 5,201,523 A | * | 4/1993 | Miller ......................... 473/383 |
| 5,827,548 A | | 10/1998 | Lavallee et al. |
| 5,849,237 A | * | 12/1998 | Inoue .......................... 264/319 |
| 6,422,850 B1 | * | 7/2002 | Shannon et al. ............ 425/116 |

FOREIGN PATENT DOCUMENTS

JP   6-315949   * 11/1994

* cited by examiner

Primary Examiner—Edmund H. Lee

(57) ABSTRACT

An improved golf ball injection mold is characterized by upper and lower support plates each containing corresponding hemispherical cavities which define spherical mold cavities when the plates are brought together. A plurality of retractable core pins are arranged in each cavity for supporting a core of a golf ball. Fluid thermoplastic material is supplied to each cavity to form the cover layer on the golf ball core. A valve pin is arranged in a gate in the upper plate in the center of the upper hemispherical cavity adjacent to a pole of the golf ball being formed in the cavity. The valve pin is operable between extended and retracted positions relative to the gate to deliver the thermoplastic material to the cavity and a closed position intermediate of the extended and retracted positions to stop the flow of thermoplastic material during curing of the cover layer.

7 Claims, 3 Drawing Sheets

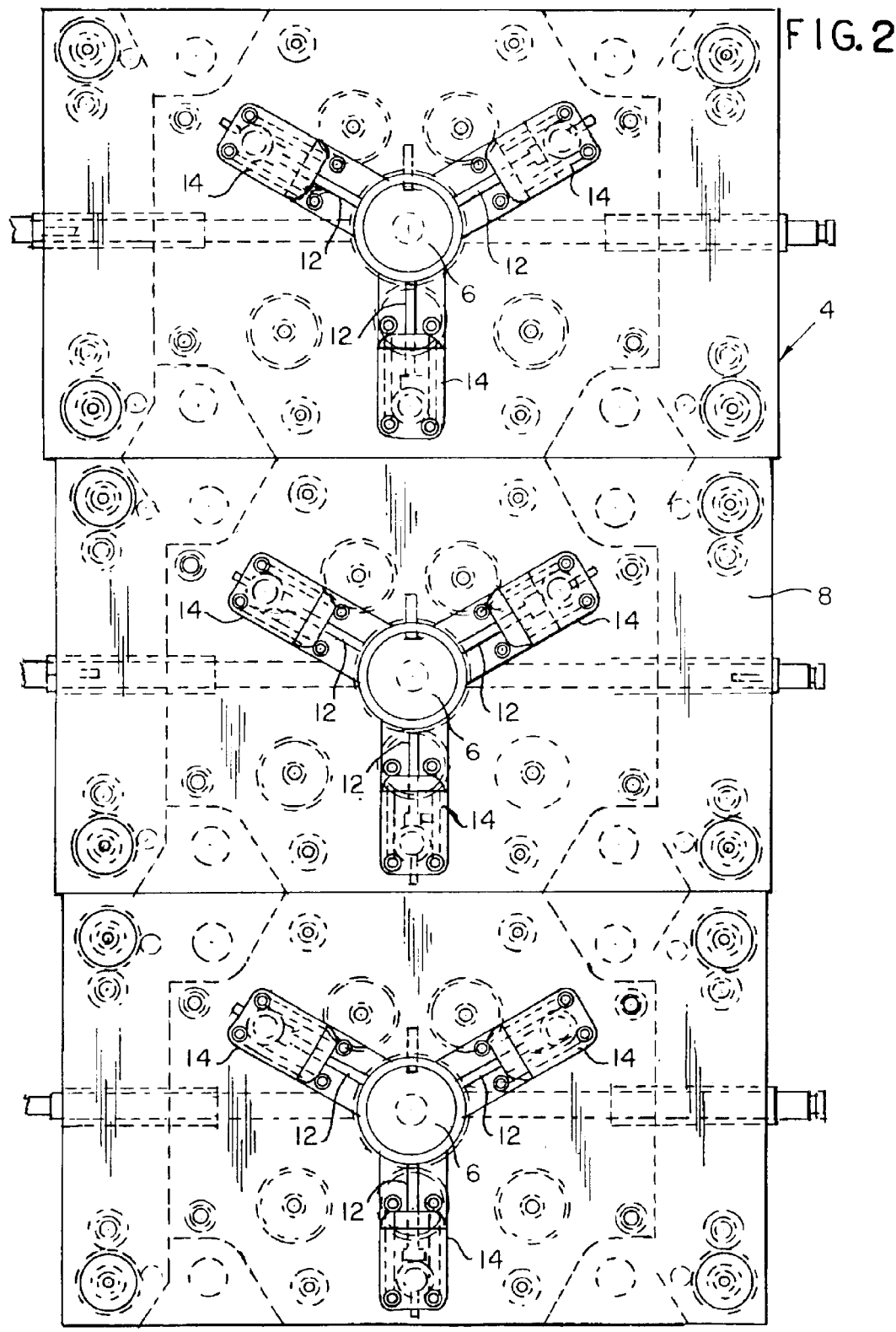

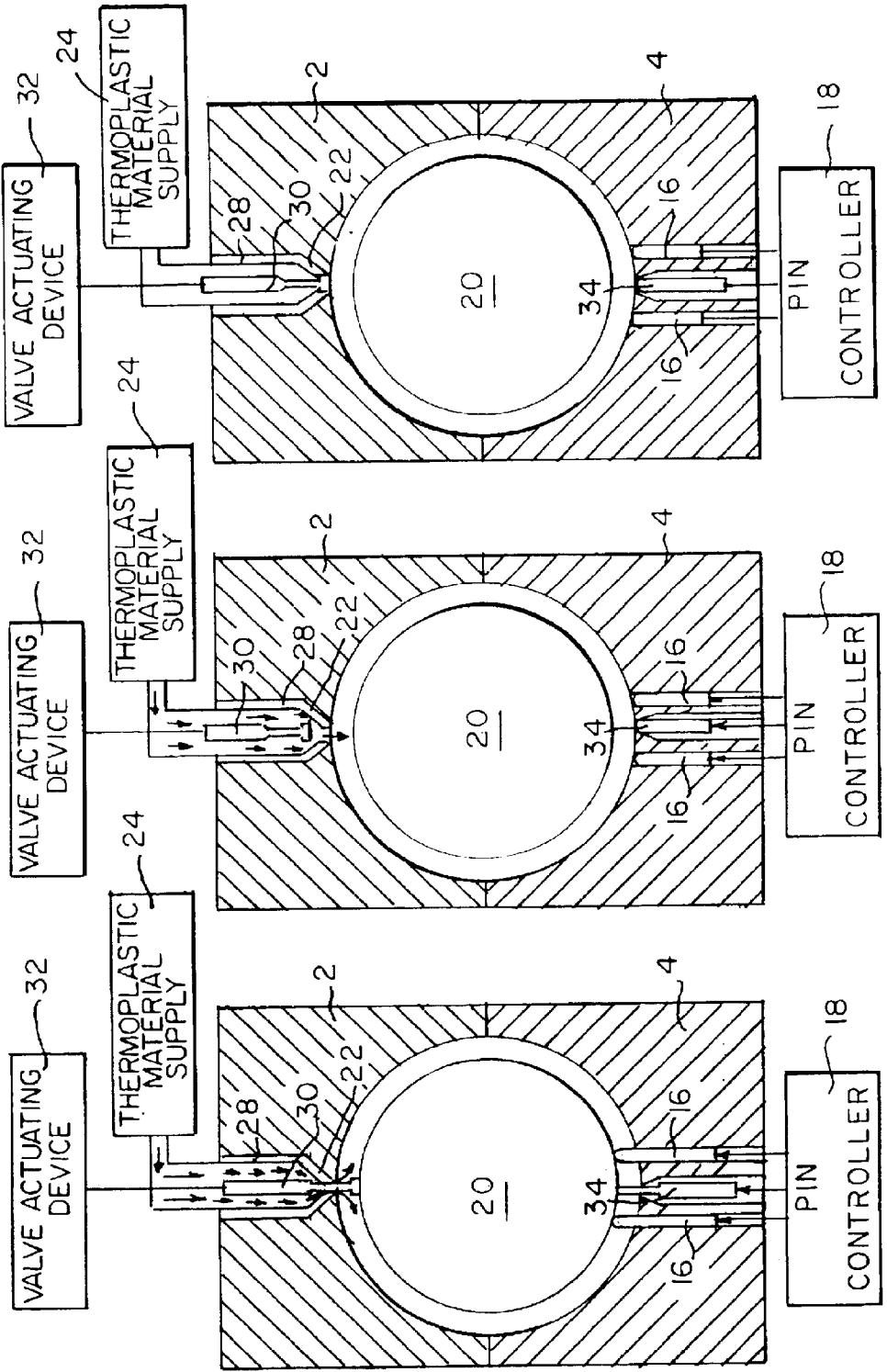

DIRECT CAVITY GATE GOLF BALL INJECTION MOLD

BACKGROUND OF THE INVENTION

In the golf ball manufacturing process, it is common practice to form the cover of the ball using injection molding. A mold comprising a pair of parallel plates containing opposed hemispherical cavities is used to form a spherical cavity within which a golf ball core is suspended by retractable pins. Fluid thermoplastic material is supplied to the cavity to form the cover layer of the ball. After the thermoplastic material sets, the plates are separated and the golf ball is removed from the cavity.

The present invention relates to an improved mold for simultaneously injection molding a plurality of golf balls which have improved surface characteristics and minimal imperfections.

BRIEF DESCRIPTION OF THE PRIOR ART

Injection molds for forming golf balls are well-known in the patented prior art. The Lavallee et al U.S. Pat. No. 5,827,548, for example, discloses a retractable pin golf ball injection mold wherein thermoplastic material is delivered to a plurality of spherical cavities defined by upper and lower support plates via a balanced runner system to form the cover layers on golf ball cores arranged in the cavities. Each cavity has a number of gates defined at the parting line defined where the plates meet at the equator of the golf ball. The balanced runners allow the thermoplastic material to be evenly supplied to cavities so that a number of golf balls are formed simultaneously. Coolant is circulated through the plates to reduce the cure time for the cover layer. An ejector mechanism is also provided to eject the finished golf balls from the cavities and excess thermoplastic material from the runner system.

The Giza U.S. Pat. Nos. 4,959,000 and 5,147,657 disclose retractable pin molds for golf balls where the gate valves are at the poles of the golf ball.

While the prior devices operate satisfactorily, they still possess inherent drawbacks which lead to imperfections in the golf ball surface and which limit the production capacity owing to the time required to finish the golf balls. More particularly, the plurality of parting line gates in the prior Lavallee et al device result in gate vestiges in the ball surface. These must be trimmed or otherwise removed to finish the golf ball. Moreover, the excess thermoplastic material from the runners must be removed therefrom and then re-heated to a fluid state for use in subsequent injection molding operations.

The present invention was developed in order to overcome these and other drawbacks of the prior golf ball molds by providing a golf ball mold in which a single direct cavity gate is provided at the pole of the ball in the upper support plate.

SUMMARY OF THE INVENTION

Accordingly, it is a primary object of the present invention to provide an injection mold for simultaneously molding the cover onto a plurality of golf balls. The mold includes upper and lower support plates each of which contain a plurality of hemispherical cavities which are adapted to mate to define a plurality of spherical cavities when the plates are brought together. Retractable core pins are arranged in each of the cavities to support a core of a golf ball. A direct cavity gate is arranged at the top dead center of the upper hemispherical cavity to supply fluid thermoplastic material to the cavity to form the cover layer on the golf ball core. A valve pin is arranged in the gate and is operable between a first position wherein the pin extends into the cavity to engage the core and to allow thermoplastic material to enter the cavity and surround the core, a second position wherein the pin is retracted into the upper support plate out of contact with the core to allow thermoplastic material to fill the cavity, and a third position between the first and second positions wherein the pin closes the gate to stop the supply of thermoplastic material into the cavity.

According to a further object of the invention, the valve pin has a contoured lower end which forms a pole dimple on the golf ball surface when the valve pin is in the third position. In addition, a control mechanism is provided to displace the valve pin between the first, second, and third positions and to displace the retractable core pins.

It is yet another object of the invention to provide two types of core pins. In a first embodiment, the core pins are arranged laterally and equally spaced about the lower hemispherical cavity. In a second embodiment, the core pins are equally spaced about the lower hemispherical cavity and have longitudinal axes arranged substantially perpendicular to the parting lines. A vent pin is also provided in the lower plate and communicates with the cavity to vent air therefrom as thermoplastic material is supplied to the cavity.

BRIEF DESCRIPTION OF THE FIGURES

Other objects and advantages of the invention will become apparent from a study of the following specification when viewed in the light of the accompanying drawing, in which:

FIG. 2 is a top plan view of the bottom mold plate of FIG. 1; and

FIGS. 3, 4, and 5 are detailed sectional views showing the valve pin of the invention in the first, second and third positions, respectively.

DETAILED DESCRIPTION

Figure 1:
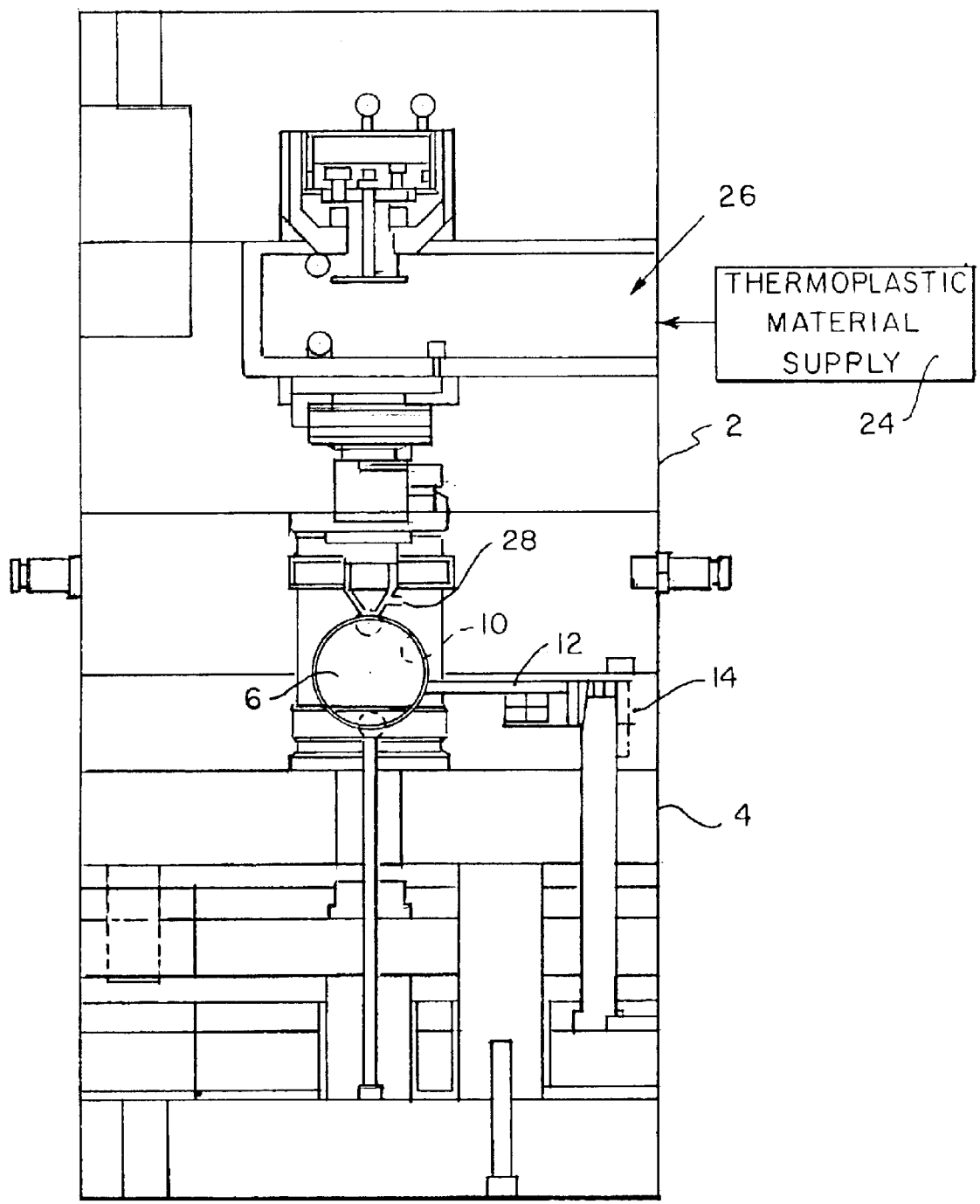
FIG. 1 is a front sectional view of the golf ball injection mold according to the invention.

Referring initially to FIGS. 1 and 2, the golf ball injection mold according to the invention will be described. The mold includes upper 2 and lower 4 plates which can be displaced relative to one another in a conventional manner between the contiguous position shown in FIG. 1 and a spaced position. The lower plate 4 includes a plurality of spaced hemispherical cavities 6 in the upper surface 8 thereof as shown in FIG. 2 while the upper plate 2 includes corresponding hemispherical cavities 10 in the lower surface thereof. A parting line is defined where each hemispherical cavity terminates with the corresponding surface. When the plates are brought together in contiguous relation, the respective upper and lower hemispherical cavities cooperate to define a plurality of spherical cavities, one for each golf ball being formed. In the example illustrated in FIG. 2, three cavities are defined. However, it will be appreciated that any convenient number of cavities may be provided to simultaneously cover that number of golf balls. Each hemispherical cavity includes a patterned surface (not shown) which will define a dimple pattern in the outer surface of the golf ball.

In the embodiment shown in FIGS. 1 and 2, the lower hemispherical cavities 6 also include a plurality of laterally extending retractable core pins 12. The pins have axes parallel to the parting lines of the respective plates and are extensible into the spherical cavity under control of a first pin actuating mechanism 14 to support a golf ball core during the injection molding process. As shown in FIG. 2, the pins are equally spaced around the lower hemispherical cavities, with three pins being provided for each cavity, although the invention is not restricted to three pins.

In addition to or in lieu of the lateral pins 12, the lower hemispherical cavities may also be provided with a plurality of retractable core pins 16 which have longitudinal axes which are arranged substantially perpendicular to the parting lines defined where the cavities terminate at the surface 8 of the lower support plate 4 as shown in FIGS. 3–5. The pins are equally spaced about each lower hemispherical cavity and are operated by a pin controller 18 to support a golf ball core 20 within each spherical cavity.

In order to supply fluid thermoplastic material to each cavity to form the cover layer on the golf ball core, a cavity gate 22 having an opening is provided in the center of each upper hemispherical cavity 10 as shown in FIGS. 3–5. Fluid thermoplastic material is delivered from a supply 24 to the gate via a hot runner manifold 26 (FIG. 1) in the upper support plate 2 and via a heated nozzle 28 adjacent to each gate 22. Delivery of fluid thermoplastic material is controlled by a valve pin 30 which is operable between three positions under the control of a valve actuating device 32. The valve pin has a lower end having a diameter matching the cavity gate opening for closing the same. Above the lower end, the valve pin includes a narrow portion having a diameter less than that of the lower end to allow thermoplastic material to pass thereby when the narrow portion is in the opening of the cavity gate as will be described with reference to FIGS. 3–5.

In the first position shown in FIG. 3, the lower end of the valve pin 30 extends into the cavity and abuts against the top of the golf ball core 20 to hold it against the lower core pins 12 and/or 16. In this manner, the core is centered in the spherical cavity, nesting against the lower pins while heated fluid or molten thermoplastic material is delivered from the gate to the cavity to surround the core 20. No core movement is allowed during fill of the cavity with the thermoplastic material. Near the end of the fill process, the core support pins are retracted and the voids created by their retraction become filled with molten thermoplastic material. The valve pin 30 is retracted into the heated nozzle 28 in the upper support plate 2 to its second position shown in FIG. 4 to allow molten material to continue to flow through the gate 22. When the cavity is completely filled, the valve actuating device 32 displaces the valve pin 30 to its third position (FIG. 5) between the first and second positions where the lower end of the pin closes the gate 22 to stop the flow of molten material into the cavity. The cavity is thus sealed to allow the molten material to cure. Preferably, the lower end of the valve pin is contoured to form a dimple at the pole of the golf ball.

In order to allow air from the cavity to escape the cavity as thermoplastic material is supplied thereto, a vent pin 34 is provided in an opening in the lower support plate 4 which communicates with the lower hemispherical cavities as shown in FIGS. 3–5. Movement of the vent pin is controlled by the pin controller 18. More particularly, as thermoplastic material is delivered to the spherical cavity, the vent pin 34 is allowed to extend into the opening in the lower hemispherical cavities as shown in FIG. 3. The pin tip is ground to a smaller diameter than the pin body to allow air to be vented from the cavity as the thermoplastic material fills the same. When the core pins 12 and/or 16 are retracted, the vent pin 34 is also allowed to retract as shown in FIG. 4, thus forming a cosmetically acceptable surface during final fill of the cavity. The vent pin remains in the retracted position allowing air to be vented through the clearance between the pin opening and the pin tip. While this clearance is sufficient to allow the passage of air, it is not great enough to allow the flashing of viscous thermoplastic material and therefore allows the cavity to seal during curing of the material (FIG. 5). In addition, the upper end of the vent pin may be contoured to form a dimple at the lower pole of the ball.

After the golf ball cover material has hardened, the plates are separated and the golf balls are ejected from the cavities. To this end, the lower plate retractable core pins 16 are displaced into the respective cavities a distance corresponding to the cover thickness to eject the balls from the cavities. Movement of the pins 16 is controlled by the controller 18.

Injection molding a golf ball cover layer using the direct cavity gate valve pin according to the invention eliminates the use of multiple gates at the mold parting line or equator of the ball. By eliminating the parting line gates, the number of knit lines in the thermoplastic cover material is reduced to a single knit point at the pole opposite the supply gate 22. Minimizing the number of flow fronts where the material is required to weld itself together to form the cover layer increases the overall durability of the cover.

Since the valve pin 30 forms a pole dimple as it moves into the third position and the conventional gates at the parting line are eliminated, the golf ball requires less finishing after the molding operation. There is no need for mechanical trimming of the parting line because there are no gate vestiges to remove from the ball.

Direct cavity gating from a hot runner system eliminates the cold runner system of the conventional injection molding devices. There is no need to reprocess excess runner material which is a byproduct of a cold runner system. By using individual hot thermoplastic material fills for each cavity in a multi-cavity mold, the individual fills can be precisely tuned to control the flow of material into each cavity rather than relying on the geometric balance of a the cold runner system. This affords the precision molding characteristics of a single cavity mold with the volume benefits of a multi-cavity mold.

While in accordance with the provisions of the patent statute the preferred forms and embodiments of the invention have been illustrated and described, it will be apparent to those of ordinary skill in the art that various changes and modifications may be made without deviating from the inventive concepts set forth above.

What is claimed is:

1. An injection mold for applying a cover layer to golf balls, comprising (a) upper and lower support plates each containing at least one hemispherical cavity, said upper and lower hemispherical cavities being adapted to mate to define at least one spherical cavity when said plates are brought together;

(b) a plurality of retractable core pins arranged in said lower support plates and extendable into each of said lower hemispherical cavities for supporting a core of a golf ball within said spherical cavity;

(c) means for supplying fluid thermoplastic material to each of said cavities to form a cover on the golf ball core, said supplying means including a valve pin arranged in a gate in said upper plate in a center of said upper hemispherical cavity adjacent to a pole of the golf ball formed in said cavity, said valve pin being operable between a first position wherein said pin extends into said cavity to engage the core and to allow thermoplastic material to enter the cavity and surround the core, a second position wherein said pin is retracted into said upper support plate out of contact with the core to allow thermoplastic material to fill the cavity, and a third position between said first and second positions wherein said pin closes said gate to stop the supply of thermoplastic material into said cavity; and (d) a vent pin arranged in an opening in said lower plate communicating with said cavity to vent air therefrom during supply of thermoplastic material.

2. An injection mold as defined in claim 1, and further comprising means for displacing said valve pin between said first, second, and third positions.

3. An injection mold as defined in claim 2, wherein said supplying means further comprises a heated manifold for maintaining said thermoplastic material in a fluid state for injection into said cavity.

4. An injection mold as defined in claim 2, wherein said valve pin has a contoured lower surface to form a dimple at the pole of the golf ball when said valve pin is in said third position.

5. An injection mold as defined in claim 1, wherein said retractable core pins are arranged laterally and equally spaced about said lower hemispherical cavity.

6. An injection mold as defined in claim 1, wherein said retractable core pins are equally spaced about said lower hemispherical cavity and have longitudinal axes arranged substantially perpendicular to parting lines defined where said cavities terminate at a surface of said plates.

7. An injection mold for applying a cover layer to golf balls, comprising (a) upper and lower support plates each containing at least one hemispherical cavity, said upper and lower hemispherical cavities being adapted to mate to define at least one spherical cavity when said plates are brought together;

(b) a plurality of retractable core pins arranged in said lower support plates and extendable into each of said lower hemispherical cavities for supporting a core of a golf ball within said spherical cavity;

(c) means for supplying fluid thermoplastic material to each of said cavities to form a cover on the golf ball core, said supplying means including a valve pin arranged in a gate in said upper plate in a center of said upper hemispherical cavity adjacent to a pole of the golf ball formed in said cavity, said valve pin including a lower end having a diameter corresponding with an opening in said gate and a narrow portion above said lower end having a diameter less than the diameter of said lower end, said valve pin being operable between a first position wherein said pin extends into said cavity to engage the core and to allow thermoplastic material to enter the cavity past said valve pin narrow portion and through said gate opening to surround the core, a second position wherein said pin is retracted into said upper support plate out of contact with the core to allow unrestricted flow of thermoplastic material to fill the cavity; and a third position between said first and second positions wherein said pin lower end closes said gate to stop the supply of thermoplastic material into said cavity; and (d) a vent pin arranged in an opening in said lower plate communicating with said cavity to vent air therefrom during supply of thermoplastic material.

\* \* \* \* \*